United States Patent
Liao

(10) Patent No.: US 9,179,116 B1
(45) Date of Patent: Nov. 3, 2015

(54) PREVIEWING AND PLAYING MEDIA ITEMS BASED ON SCENES

(71) Applicant: Google Inc., Mountain View, CA (US)

(72) Inventor: Tawei Liao, Zollikerberg (CH)

(73) Assignee: GOOGLE INC., Mountain View, CA (US)

(*) Notice: Subject to any disclaimer, the term of this patent is extended or adjusted under 35 U.S.C. 154(b) by 115 days.

(21) Appl. No.: 13/914,407

(22) Filed: Jun. 10, 2013

(51) Int. Cl.
H04N 9/80 (2006.01)
H04N 9/87 (2006.01)

(52) U.S. Cl.
CPC ..................... *H04N 9/87* (2013.01)

(58) Field of Classification Search
USPC ........................................... 386/241
See application file for complete search history.

(56) References Cited

U.S. PATENT DOCUMENTS

2004/0189690 A1* 9/2004 Poslinski et al. .............. 345/719
2011/0217019 A1* 9/2011 Kamezawa et al. .......... 386/224

* cited by examiner

*Primary Examiner* — Hung Dang
*Assistant Examiner* — Girumsew Wendmagegn
(74) *Attorney, Agent, or Firm* — Lowenstein Sandler LLP

(57) ABSTRACT

A plurality of scenes in a digital video are identified. The length of each scene is compared with a first threshold length and a second threshold length. When the scene is longer than the first threshold length and does not exceed the second threshold length, a first preview is generated for the scene. When the scene is longer than the first threshold length and longer than the second threshold length, a plurality of previews for the scene is generated.

19 Claims, 9 Drawing Sheets

PREVIEWING AND PLAYING MEDIA ITEMS BASED ON SCENES

BACKGROUND

Computing devices such as smart phones, cellular phones, laptop computers, desktop computers, netbooks, tablet computers, etc., are commonly used for a variety of different purposes. Users often use media viewers (e.g., an application that allows a user to consume a media item, such as a web browser, a standalone application, etc.) on computing devices to use, play, and/or consume digital media items (e.g., view digital images, watch digital video, and/or listen to digital music).

Users may often preview portions of media items when consuming the media items. For example, the user may move a pointer (e.g., a mouse pointer) over a portion of a playback bar to preview the frame and/or image that may be presented at a particular time. Numerous previews may be generated for each media item. For example, one preview may be generated for every second of a video. Users can also skip, jump, and/or seek to different portions of the media item. For example, a user may be allowed to jump to any point in time within a video.

SUMMARY

In one embodiment, a method of generating previews for a media item is presented. A plurality of scenes in a digital video are identified. The length of each scene is compared with a first threshold length and a second threshold length. When the scene is longer than the first threshold length and shorter than the second threshold length, a first preview is generated for the scene. When the scene is longer than the first threshold length and longer than the second threshold length, a plurality of previews for the scene is generated. In another embodiment, each preview may be associated with the scene or a portion of the scene. In a further embodiment, the previews may be generated based on times and/or timestamps or may be generated based on frames within the plurality of scenes.

In another embodiment, the method further include receiving a user input indicating a request to preview the digital video at a particular time in the digital video and identifying a second preview, wherein the second preview is associated with a second scene or a portion of the second scene at the particular time. Identifying the second preview may include identifying the second scene or the portion of the second scene based on the particular time and identifying the second preview based on the second scene or the portion of the second scene. The method may provide the second preview to a client device. In a further embodiment, the method may further include receiving a user input indicating a request to seek to a particular time in the digital video and identifying a second scene or a second portion of the scene located at the particular time, based on the user input. The method may provide access to the digital video starting at the second scene or the portion of the second scene.

In additional embodiments, computing devices for performing the operations of the above described embodiments are also implemented. Additionally, in embodiments of the disclosure, a computer readable storage media may store instructions for performing the operations of the embodiments described herein.

The above summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
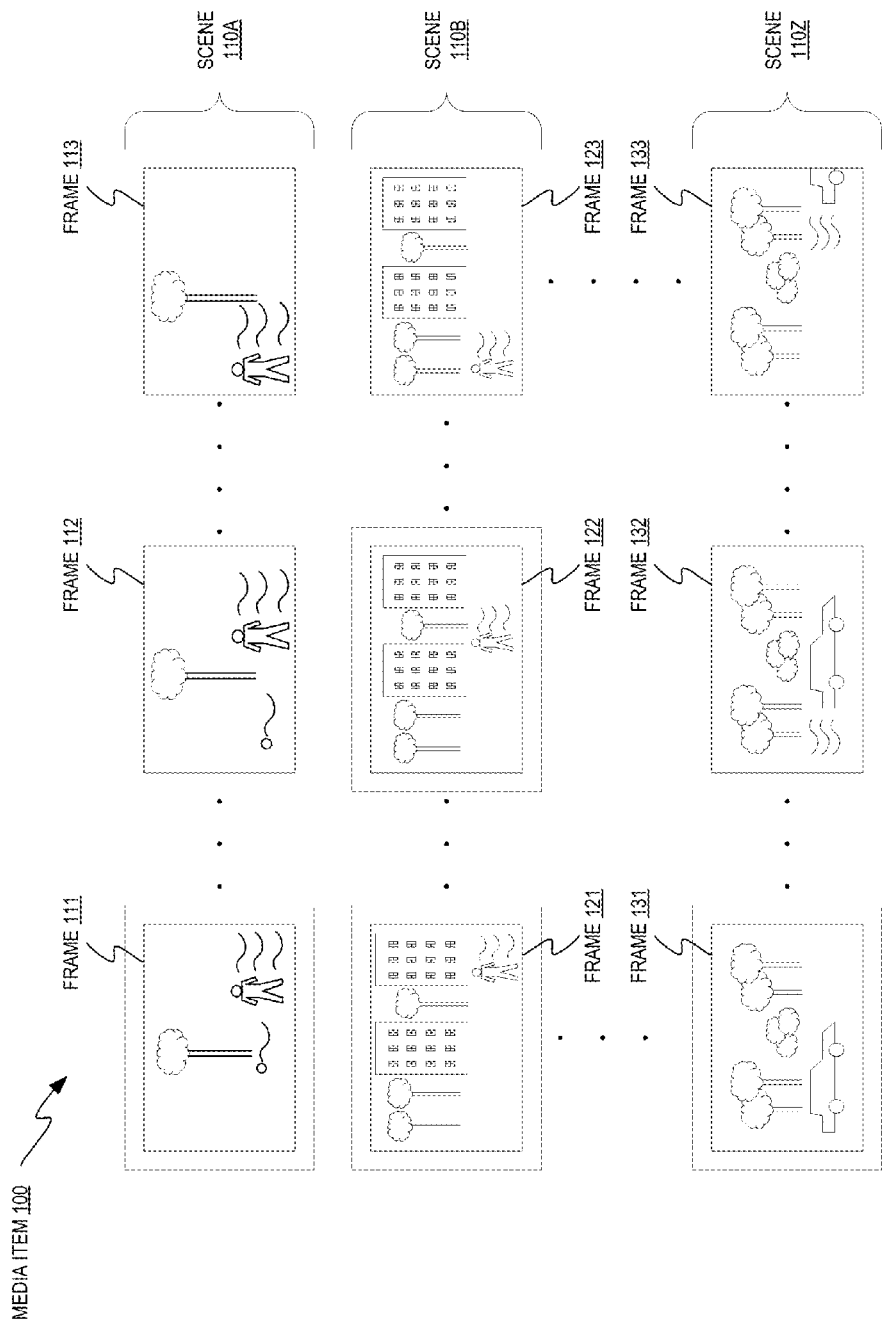
FIG. 1 is a block diagram illustrating a media item, in accordance with one embodiment of the present disclosure.

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

A content sharing platform may provide media items and/or access to media items to users. The content sharing platform may generate and/or provide previews for the media item. For example, the content sharing platform may generate one preview for each second of a media item such as a video. The content sharing platform may generate a large number of previews for longer media items. This may increase the amount of data that is generated by the content sharing platform, the amount of storage space used by the content sharing platform, and the amount of data communicated/transferred between the content sharing platform and the client device. In addition, the content sharing platform may also allow a user to seek (e.g., skip and/or jump) to any point in time in the media item 100. Allowing users to seek to any point in time in the media item 100 may cause the content sharing platform to constantly re-store and/or re-cache random portions of the media item. This may cause cache thrashing or memory thrashing in the content sharing platform.

Embodiments of the disclosure pertain to generating previews for media items, providing previews of media items to users, and providing media items to users based on scenes in the media items. A media item may be analyzed to identify different scenes in the media item. If the scene is too short, no preview may be generated for the scene. If the scene is long enough one or more previews may be generated for the scene. Each preview may be associated with the scene and/or a portion of the scene. When the user requests a preview of a particular point in time in the media item, the content sharing platform may provide the preview associated with the scene and/or portion of the scene at the particular point in time. Because previews are generated on a per scene basis (e.g., one per scene and/or per portion of the scene), fewer previews are generated which allows the content sharing platform to use fewer resources (e.g., use less processing power, less storage space, less network bandwidth, etc.).

In one embodiment, the content sharing platform may allow users to seek, skip, and/or jump to different points in times in the media item on scene basis. For example, the content sharing platform may only allow users to seek to the beginning of a scene, or to the beginning of a portion of the scene, instead of allowing users to seek to any point in time in the media item. Because users may not be able to seek to any random or arbitrary point in time in the video, the content sharing platform may reduce the amount of cache thrashing or memory thrashing that occurs.

FIG. 1 is a block diagram illustrating a media item 100, in accordance with one embodiment of the present disclosure. In one embodiment, the media item 100 may be digital content such as a digital video. The digital videos may be streaming videos (e.g., is received by and presented to the user while being received from another computing device) and/or locally stored videos (e.g., digital video that is stored in a local memory of a computing device). The media item 100 may be in a variety of formats including, but not limited to, moving picture experts group format, MPEG-4 (MP4) format, DivX® format, Flash® format, a QuickTime® format, an audio visual interleave (AVI) format, a Windows Media Video (WMV) format, a Matroska (MKV) format etc. The media item 100 includes multiple frames (e.g., images) including frames 111, 112, 113, 121, 122, 123, 131, 132, and 133. The frames 111, 112, 113, 121, 122, 123, 131, 132, and 133 (e.g., the images) may be in a variety of different formats, including, but not limited to, a Joint Picture Experts Group (JPEG) format, a bitmap (BMP) format, a graphics interchange format (GIF), a Portable Network Graphics (PNG) format, etc. In one embodiment, the media item 100 may be a digital video that has a certain frame rate (e.g., a digital video that includes a certain number of frames per second (FPS). For example, the media item 100 may have thirty, fifty, or one hundred frames per second. Each frame in the media item 100 may be associated with a time and/or timestamp. For example, frame 111 may be associated with the timestamp "0:00" indicating that the frame 111 may be displayed zero seconds into the media item 100 (e.g., at the beginning of the media item 100). In another example, the frame 122 may be associated with the time stamp 2:00 indicating that frame 122 may be displayed two minutes (e.g., one-hundred and twenty seconds) into the media item 100.

Figure 3:
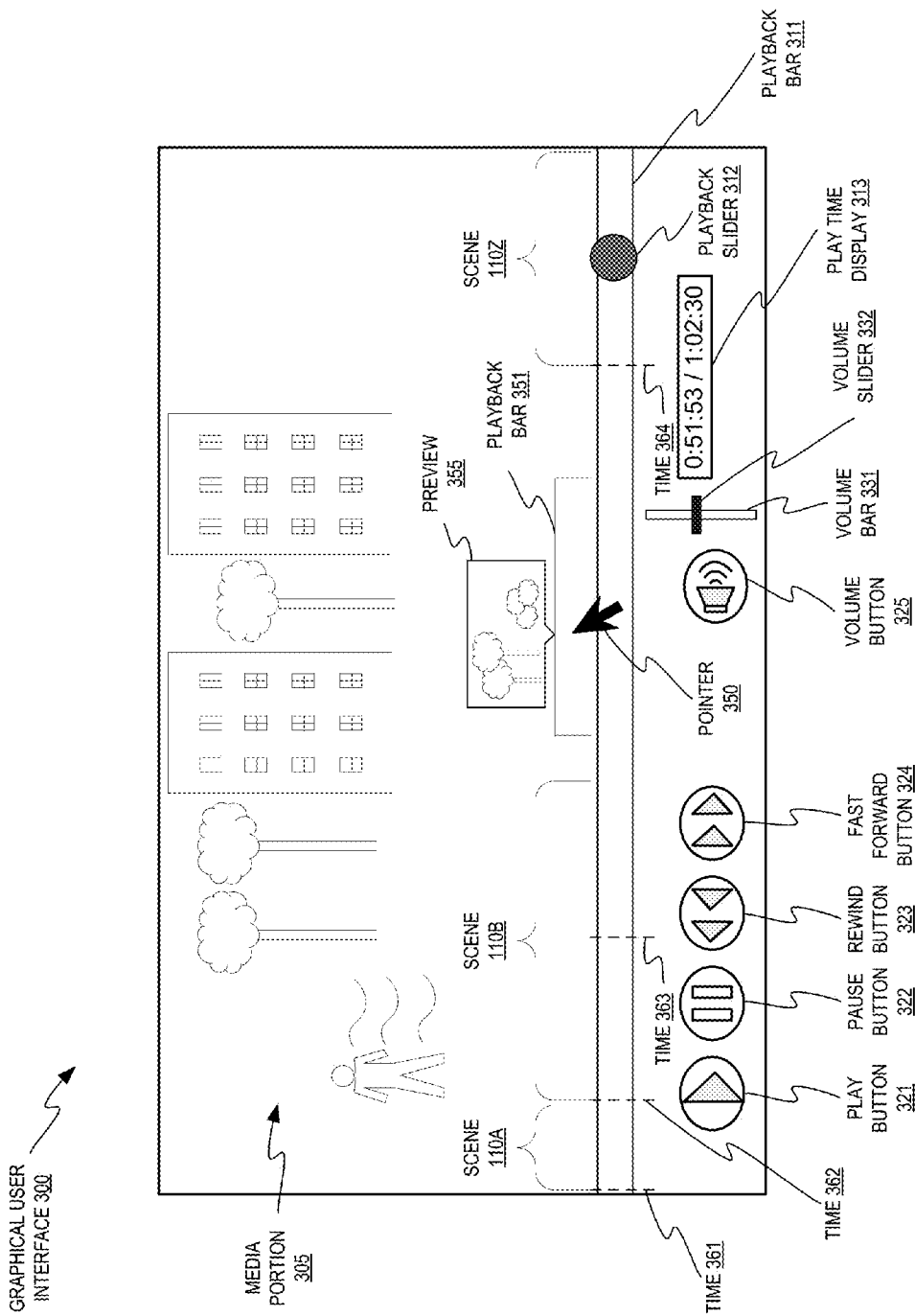
FIG. 3 is a diagram illustrating an example graphical user interface (GUI) in accordance with another embodiment of the present disclosure.
Figure 4:
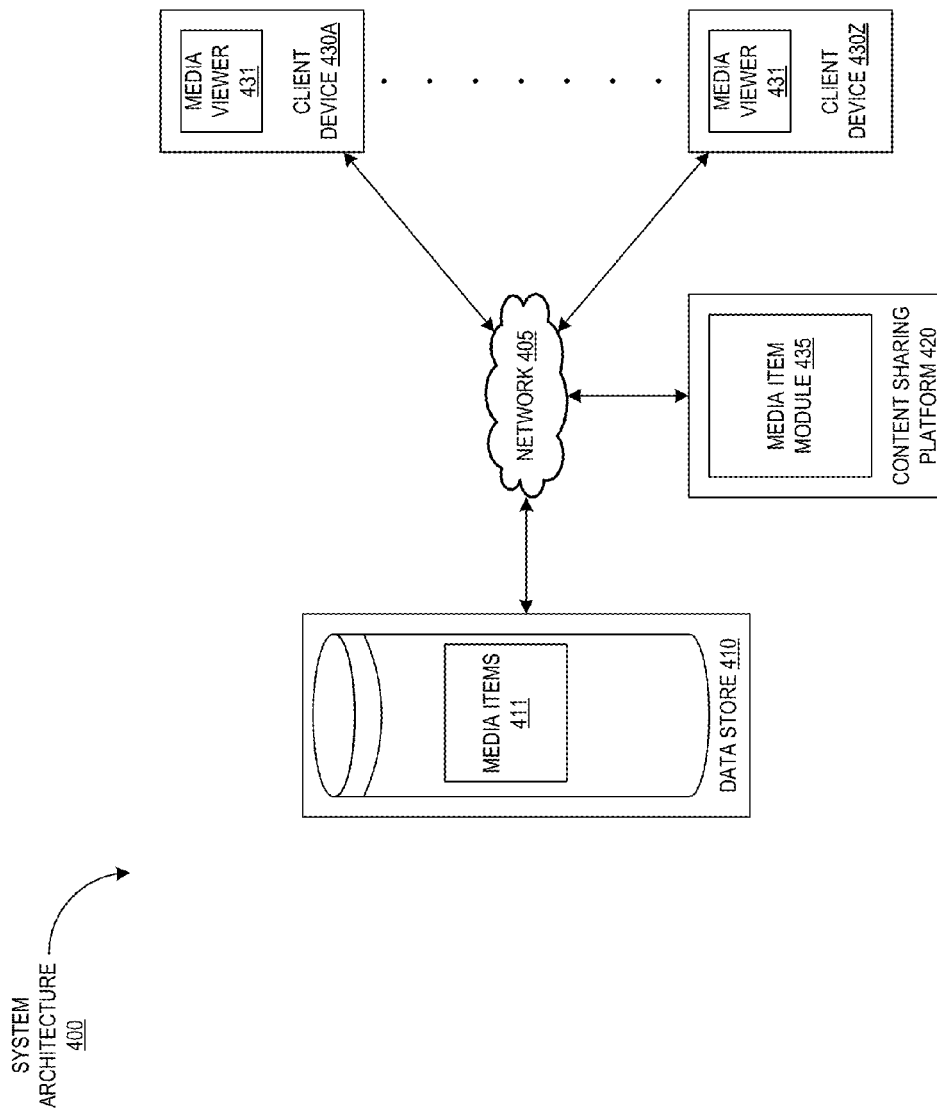
FIG. 4 illustrates an example system architecture, in accordance with one embodiment of the present disclosure.

The media item 100 and/or access to the media item 100 may be provided to a user by a content sharing platform (e.g., content sharing platform 420 illustrated in FIG. 4). For example, the media item 100 may be a streaming video that is provided to the user by the content sharing platform. The content sharing platform may provide previews (e.g., thumbnails, images, pictures, icons, etc.) of the streaming video to the user when the user views the media item 100. For example, the user may view the media item 100 using a media viewer (e.g., a web browser, a media player application, etc., as discussed below in conjunction with FIGS. 2-4). The media viewer may provide a graphical user interface that includes a playback bar (e.g., a seek bar and/or other graphical user interface element that allows a user to skip to different points in time in a media item), as discussed below in conjunction with FIGS. 2-4. The media viewer may receive previews (e.g., a thumbnail, image, pictures, icon, etc.) from the content sharing platform and may present the previews to the user when the user interacts with the playback bar (as discussed below in conjunction with FIGS. 2-4). For example, when the user moves a cursor or a pointer over a portion of the playback bar and/or moves a playback slider to the portion of the playback bar, the media viewer may provide a preview of the media item 100 (e.g., an image, a frame, etc.) at the time associated with the portion of the playback bar (as illustrated and discussed below in conjunction with FIGS. 2 and 3). When the user selects the portion of the playback bar (e.g., activates and/or clicks on the portion of the playback bar) the media viewer may seek (e.g., jump) to the point in time in the media item associated with the selected portion of the playback bar (e.g., two minutes and thirty-one seconds into the media item 100) and continue playback of the media item 100 from that point in time (e.g., two minutes and thirty-one seconds into the media item 100).

The content sharing platform may generate and/or provide previews for the media item 100 for certain points in time in the media item 100. For example, the content sharing platform may generate one preview for each second of the media item 100 (e.g., the content sharing platform may generate one-hundred and twenty previews for a two minute long media item). However, the longer the media item 100, the more previews the content sharing platform may generated and provide to the user (e.g., the media viewer on a client device of the user). This may increase the amount of data that is generated by the content sharing platform and communicated/transferred between the content sharing platform and the client device.

In addition, the content sharing platform may also allow a user to seek (e.g., skip and/or jump) to any point in time in the media item 100. For example, the user may be able to seek to any second of the media item 100 (e.g., sixty seconds (one minute) into the media item 100, one-hundred twenty-two seconds (two minutes and two seconds) into the media item 100, etc.). Allowing users to seek to any point in time in the media item 100 may cause the content sharing platform to constantly re-store and/or re-cache portions of the media item. This may cause the content sharing platform to cache large segments of the media item 100 and/or the entire media item 100. Users often skip around to different points in time in a media item. For example, a user may skip to a portion of the media item 100, consume the media item (e.g., watch) for a few seconds, determine that the portion of the media item 100 at that point in time is not interesting, and then seek to a few seconds later in the media item 100). Each time the user jumps to a different point in time in the media item, the content sharing platform may re-cache the media item starting at the time selected by the user. More often the user skips around and the new data (e.g., portions of the media item) may be re-cached by the content sharing platform. This may cause cache thrashing or memory thrashing in the content sharing platform.

The frames of the media item 100 may be divided into multiple scenes 110A through 110Z. A scene may refer to a set of frames combined based on one or more criteria (e.g., a common place, a common scene, a consecutive occurrence over a time period, etc.). For example, scene 110A includes frames 111, 112, and 113, scene 110B includes frames 121, 122, and 123, and scene 110Z includes frames 131, 132, and 133. In one embodiment, a scene may depict events and/or actions in a location. In another embodiment, a scene may depict events and/or action over a period of time. The scenes 110A through 110Z may include various different types of scenes including, but not limited to, love scenes, dream scenes, action scenes, car chase scenes, crash scenes, etc. Media item 100 may also include an opening scene and/or a closing scene. In another embodiment, a scene may refer to an association of time, place (e.g., location) and characters (e.g., actors, people, and/or subjects in the media item 100). In one embodiment, the content sharing platform may analyze the media item 100 and may identify different scenes in the media item 100. For example, the content sharing platform may use a variety of different algorithms, functions, operations, software modules, software components, and/or applications to identify scenes 110A through 110Z in the media item 100.

In one embodiment, the content sharing platform may generate previews (e.g., thumbnails, images, pictures, icons, etc.) for the media item 100 based on the scenes 110A through 110Z. The content sharing platform may generate one or more previews for one more of the scenes 110A through 110Z based on the length of the scenes 110A through 110Z. In one embodiment, the content sharing platform may not generate a preview for a scene if the scene is shorter than a first threshold length of time (e.g., the scene is less than thirty seconds long). The content sharing platform may generate at least one preview for the scene if the scene is longer than the first threshold length of time. The content sharing platform may generate multiple previews for a scene if the scene is longer than the first threshold length of time (e.g., longer than thirty seconds) and longer than a second threshold length of time (e.g., longer than sixty seconds).

Referring to FIG. 1, scene 110A includes multiple frames (e.g., images), including frames 111, 112, and 113. Scene 110A may be a scene that is longer than the first threshold length of time (e.g., longer than thirty seconds) and shorter than a second threshold length of time (e.g., shorter than sixty seconds). The content sharing platform may generate one preview for scene 110A based on frame 111. For example, the content sharing platform may generate a preview using the frame 111 (e.g., the image) and/or using the timestamp associated with the frame 111. Scene 110B includes multiple frames (e.g., images), including frames 121, 122, and 123. Scene 110B may be a scene that is longer than the first threshold length of time (e.g., longer than thirty seconds) and longer than a second threshold length of time (e.g., longer than sixty seconds). The content sharing platform may generate two previews for scene 110B based on frames 121 and 122. The first preview may be associated with a first portion of the scene 110B (e.g., associated with the portion of the scene 110B starting from frame 121 up the frame before frame 122). The second preview may be associated with a second portion of the scene 110B (e.g., e.g., associated with the portion of the scene 110B starting from frame 122 to the last frame in scene 110B). Scene 110Z includes multiple frames (e.g., images), including frames 131, 132, and 133. Scene 110Z may be a scene that is longer than the first threshold length of time (e.g., longer than thirty seconds) and shorter than a second threshold length of time (e.g., shorter than sixty seconds). The content sharing platform may generate one preview for scene 110Z based on frame 131.

As discussed above, the playback bar may allow a user to skip to a different time in the playback of the media item 100. Different portions of the playback bar may allow a user to skip to different scenes (as illustrated and discussed below in conjunction with FIGS. 2 and 3). Thus, different portions, segments, and/or sections of the playback bar may be associated with different scenes in the media item 100. For example, the first portion of the playback bar (e.g., seek bar) may allow a user to seek to the first scene in the media item 100. In one embodiment, when the user interacts with the playback bar (e.g., moves a cursor, pointer over a portion of the playback bar, moves a playback slider to the portion of the playback bar, etc.), the previews associated with the scene may be presented to the user. For example, when the user positions a cursor and/or indicates/selects a portion of the playback bar, the media viewer may request one or more previews for the scene at the portion of the playback bar, from the content sharing platform. The content sharing platform may provide the previews (e.g., images, thumbnails, pictures, icons, etc.) to the media viewer and the media viewer may present the thumbnails to the user, based on the user interaction with the playback bar.

In one embodiment, if a scene has one preview, the one preview may be presented to the user when the user interacts with the portion of the playback bar that is associated with the scene. In another embodiment, if a scene has multiple previews (e.g., two previews, three previews, fifteen previews, etc.), each preview may be associated with a portion of the scene. When the user interacts with a portion of the playback bar that is associated with the scene, the preview associated with the corresponding portion of the scene may be presented to the user. For example, if a scene has two previews, when the user interacts with the portion of the playback that is associated with the first portion of the scene, the first preview may be presented to the user and when the user interacts with the portion of the playback that is associated with the second portion of the scene, the second preview may be presented to the user.

In another embodiment, when the user selects and/or activates a portion of the playback bar (e.g., interacts with the playback bar), the content sharing platform may provide the media item 100 to the user starting at the scene and/or portion of the scene associated with the portion of the playback bar. For example, if the user provides input selecting a region of the playback bar that is associated with a second portion of a third scene (e.g., moving the playback slider to the region of the playback bar that is associated with the second portion of the third scene), the content sharing platform may provide the media item 100 to the user (e.g., and/or may provide access to the media item 100) starting at the second portion of the third scene.

In one embodiment, generating previews (e.g., images, thumbnails, pictures, icons, etc.) for a media item based on the length of scenes in the media item 100 allows the content sharing platform to generate fewer previews for the media item 100 while still allowing a user to preview portions of the media item 100. Generating fewer previews may allow the content sharing platform to assign more resources (such as processing power, storage space, etc.) to other functions, tasks and/or operations. Generating fewer previews may also allow the content sharing platform to transmit less data (e.g., transmit fewer previews) to a user's client device and allow the content sharing platform and the user's client device to send/receive less data (e.g., may allow the content sharing platform and/or the user to reduce network usage and/or network bandwidth).

In another embodiment, allowing users to preview scenes and/or portions of scenes and allowing users to seek to scenes and/or portions of scenes in the media item 100 (instead allowing users to seek to any point in the media item 100) may allow the content sharing platform to buffer and/or cache portions of the media item more efficiently. Because users may seek to specific times in the media item (e.g., to the beginning of a scene or to the beginning of a portion of a scene), the content sharing platform may reduce the amount of random accesses to random portions of the media item and reduce the amount of cache thrashing or memory thrashing that occurs.

Figure 2:
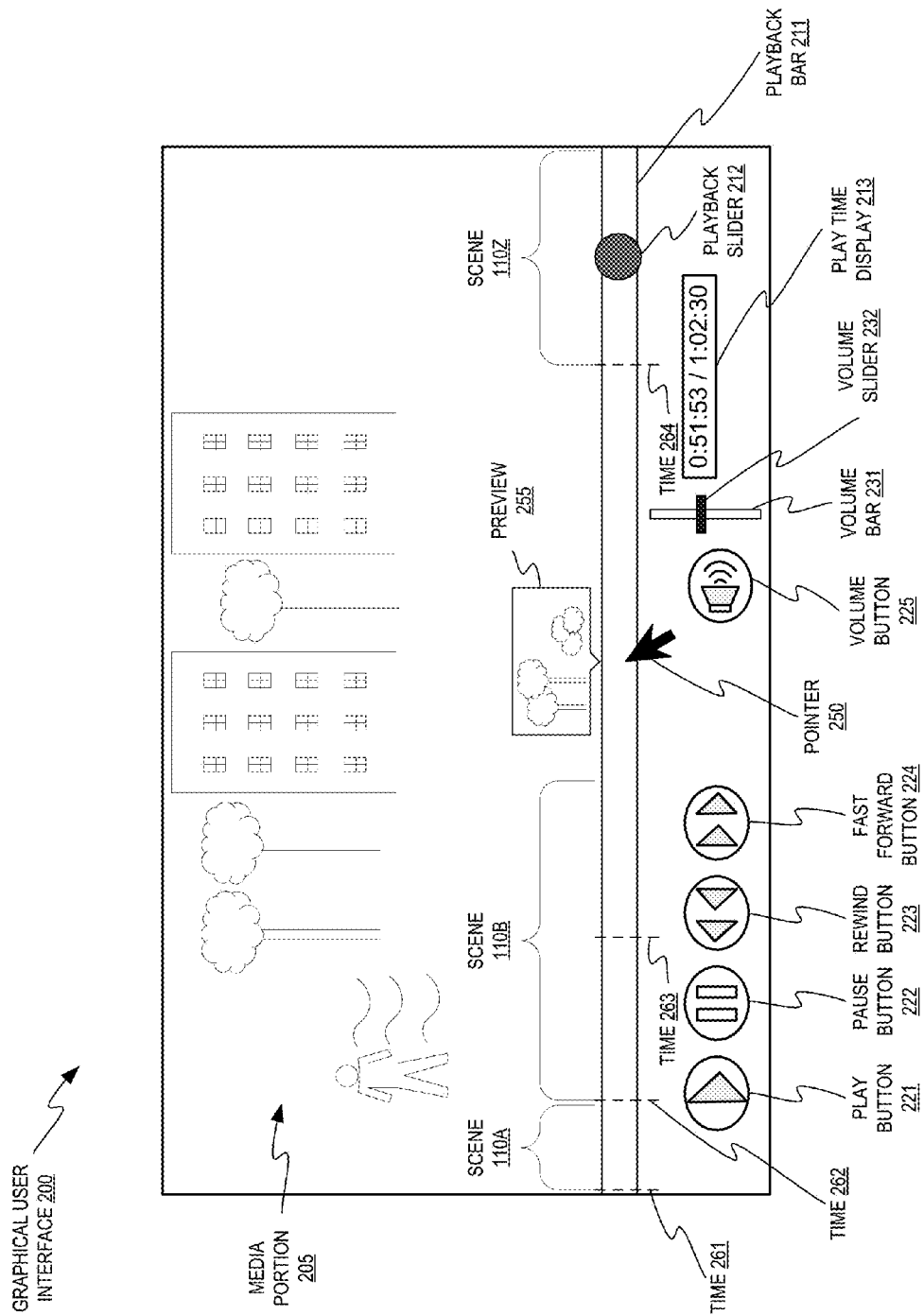
FIG. 2 is a diagram illustrating an example graphical user interface (GUI) in accordance with one embodiment of the present disclosure.

FIG. 2 is a diagram illustrating an example graphical user interface (GUI) 200 in accordance with one embodiment of the present disclosure. In one embodiment, the GUI 200 may be part of a media viewer provided by a content sharing platform (e.g., content sharing platform as illustrated and discussed below in conjunction with FIG. 4). For example, the GUI 200 may be part of a media viewer that is embedded in a web page (e.g., an embedded media viewer such as a Flash® player or a hypertext markup language-5 (HTML5) player) and the GUI 200 may be rendered by a web browser executing on a client device. In another embodiment, the GUI 200 may be part of a media viewer that may be separate from a web page (e.g., may be an application, software module, software component, etc.). For example, the media viewer may be a separate application that is executing on the client device.

The GUI 200 includes a media portion 205 that may present the media item to the user. For example, media portion 205 may be the portion of the GUI 200 where the media item is played. The media portion 205 may present or play various types of videos, images, music, and/or other media items. In one embodiment (not shown in the figures), the GUI 200 may also include buttons (e.g., magnifying glass buttons) that allow a user to zoom in and/or zoom out during the playback of the media item.

The GUI 200 also includes media viewer controls which may be used to control the playback/display of the media item (e.g., digital videos or digital music). The media viewer controls include a play button 221, a pause button 222, a rewind button 223, a fast forward button 224, and a volume button 225. The play button 221 may allow a user to begin and/or restart playback of the media item. The pause button may allow a user to pause and/or un-pause playback of the media item. The rewind button 223 may allow a user to rewind playback, move and/or skip to an earlier point in time in the media item. The fast forward button 224 may allow a user to fast forward playback, move, and/or skip to a later point in time in the media item. The GUI 200 also includes a play time display 213, a playback bar 211 and a playback slider 212. The play time display 213 may display a current play time and/or a total play time for the media item. For example, a total play time (e.g., the total length) of the media item may be one hour, two minutes, and thirty seconds (e.g., 1:02:30). The current play time may be current time/position in the playback of digital media item (e.g., fifty-one minutes and fifty-three seconds (0:51:53) into the media item). Playback slider 212 is positioned on a region of a playback bar 211 that corresponds to the current play time (e.g., 0:51:53). The playback slider 212 may be adjusted (e.g., dragged or moved) to any other region of the playback bar 211 to adjust the current play time shown in the play time display 213.

The volume button 225 may allow user to control the volume of sounds, music, and/or other audible noises in the media item. In one embodiment, the volume bar 231 and the volume slider 232 may be displayed when the user clicks and/or activates the volume button 225. For example, the volume bar 231 and the volume slider 232 may not be initially displayed in the GUI 200. After the user clicks the volume button 225, the volume bar 231 and the volume slider 232 may be displayed. The user may move and/or slide the volume slider 232 up and/or down along the volume bar 231 to control the volume of sounds, music, and/or other audible noises in the media item. For example, the user may slide the volume slider 232 up to increase the volume or may slide volume slider 232 down to decrease the volume.

As discussed above, the content sharing platform may generate previews (e.g., thumbnails, images, pictures, icons, etc.) for the media item. When the user interacts with the playback bar 211 a preview of the media item may be presented to the user. For example, when the user moves the pointer 250 (e.g., a mouse cursor, a mouse pointer) over the playback bar 211, the preview 255 is presented to the user. In one embodiment, the preview 255 may be associated with a scene and/or a portion of a scene. For example, the preview 255 may be associated with a scene and/or a portion of a scene between scene 110B and scene 110Z.

Referring to FIG. 1 and FIG. 2, frame 111 may be presented (e.g., displayed) to the user in the media portion 205 at time 261, frame 121 may be presented to the user at time 262, frame 122 may be presented to the user at time 263, and frame 131 may be presented to the user at time 264. As discussed earlier, the content sharing platform may generate previews using the frames 111, 121, 122, and 131. For example, the content sharing platform may generate a preview (e.g., an image, a frame, a picture, an icon) using frame 111 by generating a new image that may be a lower resolution version of the frame 111. In one embodiment, the preview 255 may include a timestamp associated with the beginning of the scene or the beginning of the portion of the scene. For example, the preview 255 may include a timestamp (e.g., "0:40:22") for the beginning of the scene or portion of the scene associated with the preview 255. In another embodiment, the preview 255 may also include subtitles (e.g., closed captions) for the scene or the portion of the scene. For example, the text of the first sentence or phrase spoken by a character in the scene or portion of the scene may be displayed in the preview 255. In other embodiments, the preview 255 may include other information such as annotations (e.g., a note or text) associated with the scene or portion of the scene.

As discussed above, previews may be associated with a scene/or a portion of a scene. Referring to FIG. 1, a first preview (generated based on frame 111 which is displayed at time 261) may be associated with the scene 110A. When the pointer 250 is positioned over the playback bar 211 at a position that falls within scene 110A, the GUI 200 may present the first preview to the user. A second preview (generated based on frame 121 which is displayed at time 262) may be associated with the first portion of scene 110B up to time 263. When the pointer is positioned over the playback bar 211 at a position that falls within first portion of the scene 110B, the GUI 200 may present the second preview to the user. A third preview (generated based on frame 122 which is displayed at time 263) may be associated with the second portion of scene 110B which starts at time 263 through the end of scene 110B. When the pointer is positioned over the playback bar 211 at a position that falls within a second portion of the scene 110B, the GUI 200 may present the third preview to the user. A fourth preview (generated based on frame 131 which is displayed at time 264) may be associated with the scene 110Z. When the pointer is positioned over the playback bar 211 at a position that falls within the scene 110Z, the GUI 200 may present the fourth preview to the user.

In one embodiment, the previews may also be presented to a user when the user moves and/or drags the playback slider 212 to different positions along the playback bar 211. For example, when the playback slider 212 is moved to the portion of the playback bar 211 that corresponds to scene 110A, the first preview (based on frame 111) may be presented to the user. In another example, when the playback slider 212 is moved to the portion of the playback bar 211 that corresponds to the second portion of the scene 110B, the third preview (based on frame 122) may be presented to the user.

In another embodiment, the user may move, slide, and/or drag the playback slider 212 to different positions along the playback bar 211 in order to view different portions of the media item (e.g., in order to seek to different portions of the media item). The content sharing platform may allow the user to skip and/or seek to different scenes and/or portions of scenes in the media item. For example, the content sharing platform may only allow the user to seek and/or skip to time 261 which is the beginning of scene 110A, to time 262 which is the beginning of the first portion of scene 110B, to time 263, which is the beginning of the second portion of scene 110B, and/or to time 264, which is the beginning of scene 110Z.

FIG. 3 is a diagram illustrating an example graphical user interface (GUI) 300 in accordance with another embodiment of the present disclosure. In one embodiment, the GUI 300 may be part of a media viewer (e.g., an embedded media viewer, a web browser, a standalone application, etc.) provided by a content sharing platform (e.g., content sharing platform as illustrated and discussed below in conjunction with FIG. 4). The GUI 300 includes a media portion 305 that may present the media item to the user. The media portion 305 may also play other types of videos, images, music, and/or other media items. In one embodiment (not shown in the figures), the GUI 300 may also include buttons (e.g., magnifying glass buttons) that allow a user to zoom in and/or zoom out during the playback of the media item.

The GUI 300 also includes media viewer controls which may be used to control the playback/display of the media item (e.g., digital videos or digital music). Similar to GUI 200 in FIG. 2, the media viewer controls include a play button 321 (to play or restart a media item), a pause button 322 (to pause a media item), a rewind button 323 (to rewind a media item), a fast forward button 324 (to fast forward a media item), and a volume button 325 (to control the volume of a media item). The volume button 325 may allow user to control the volume of sounds, music, and/or other audible noises in the media item. In one embodiment, the volume bar 331 and the volume slider 332 may be displayed when the user clicks and/or activates the volume button 325. Also similar to GUI 200, the GUI 300 also includes a play time display 313 (to display current play time and/or total time), a playback bar 311 and a playback slider 312. Playback slider 312 is positioned on a region of a playback bar 311 that corresponds to the current play time (e.g., 0:51:53). The playback slider 312 may be adjusted (e.g., dragged) to any other region of the playback bar 311 to seek and/or jump to a different portion of the media item.

The GUI 300 also includes a second playback bar 351. In one embodiment, the second playback bar 351 may only allow a user to seek and/or skip to different times and/or positions in the media item with more precision and/or granularity. For example, although one media item may be much longer than another media item, the length of the playback bar 311 remains the same. For a longer media item, it may be harder for the user to select different portions of scene, because the user may not be able to move a cursor or a pointer precisely enough to select the different portions of the scene. The second playback bar 351 may allow a user to more precisely select different potions of a scene. For example, the second playback bar 351 may represent a single scene in the media item (e.g., scene 110B illustrated in FIG. 1). When the user move the pointer 350 over the second playback bar 351, the GUI 300 may present a preview for one of the portions of the scene. For example, if a scene includes three portions, when the user moves the pointer over the first ⅓ of the second playback bar 351, the preview for the first portion of the scene may be displayed, when the user moves the pointer over the second ⅓ of the second playback bar 351, the preview for the second portion of the scene may be displayed, and when the user moves the pointer over the last ⅓ of the second playback bar 351, the preview for the third portion of the scene may be displayed.

As discussed above, the content sharing platform may generate previews (e.g., thumbnails, images, pictures, icons, etc.) for the media item. When the user interacts with the playback bar 311 (e.g., moves a mouse cursor/pointer over the playback bar 311 or moves the playback slider 312 to a position on the playback bar 311), the preview 255 may be presented (e.g., displayed) to the user. In one embodiment, the preview 255 may be associated with a scene and/or a portion of a scene. As discussed earlier, the content sharing platform may generate previews (e.g., a first preview, a second preview, a third preview, and a fourth preview) using the frames 111, 121, 122, and 131 and the previews may be associated with a scene/or a portion of a scene. For example, similar to FIG. 2, the first preview may be associated with the scene 110A, the second preview may be associated with the first portion of scene 110B (e.g., up to time 363), the third preview may be associated with the second portion of scene 110B (e.g., time 363 through the end of scene 110B), and the fourth preview may be associated with the scene 110Z. In another embodiment, the previews may also be presented to a user when the user moves and/or drags the playback slider 312 to different positions along the playback bar 311. The preview associated with the scene and/or portion of the scene may be displayed to the user when the user interacts with the playback bar 311. For example, the third preview may be displayed when the pointer 350 is positioned over the playback bar 311 at a position that falls within second portion of the scene 110B.

In one embodiment, the user may move, slide, and/or drag the playback slider 312 to different positions along the playback along the playback bar 311 in order to view different portions of the media item (e.g., in order to seek to different portions of the media item). In one embodiment, the content sharing platform may only allow the user to skip and/or seek to different scenes and/or portions of scenes in the media item.

FIG. 4 illustrates an example system architecture 400, in accordance with one embodiment of the present disclosure. The system architecture 400 includes client devices 430A through 430Z, a network 405, a data store 410, and a content sharing platform 420. In one embodiment, network 405 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one embodiment, the data store 410 may be may be a memory (e.g., random access memory), a cache, a drive (e.g., a hard drive), a flash drive, a database system, or another type of component or device capable of storing data. The data store 410 may also include multiple storage components (e.g., multiple drives or multiple databases) that may also span multiple computing devices (e.g., multiple server computers). The data store 410 includes media items 411 (e.g., digital videos, digital music, electronic books, etc.).

The client devices 430A through 430Z may each include computing devices such as personal computers (PCs), laptops, mobile phones, smart phones, tablet computers, netbook computers etc. Each client device includes a media viewer 431. In one embodiment, the media viewers 431 may be applications that allow users to view content, such as images, videos, web pages, documents, etc. For example, the media viewer 431 may be a web browser that can access, retrieve, present, and/or navigate content (e.g., web pages such as Hyper Text Markup Language (HTML) pages, digital media items, etc.) served by a web server. The media viewer 431 may render, display, and/or present the content (e.g., a web page, a media viewer) to a user. The media viewer 431 may also display an embedded media player (e.g., a Flash® player or an HTML5 player) that is embedded in a web page (e.g., a web page that may provide information about a product sold by an online merchant). In another example, the media viewers 431 may be a standalone application that allows users to view digital media items (e.g., digital videos, digital images, electronic books, etc.). The media viewers 431 may be provided to the client devices 430A through 430Z by the content sharing platform 420. For example, the media viewers 431 may be embedded media players that are embedded in web pages provided by the content sharing platform 420. In another example, the media viewers 431 may be applications that are downloaded from content sharing platform 420.

In one embodiment, the content sharing platform 420 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 420 may allow a user to consumer, upload, search for, approve of ("like"), dislike, and/or comment on media items. The content sharing platform 420 may also include a website (e.g., a webpage) that may be used to provide a user with access to the media items. The content sharing platform 420 may provide media items 411 and/or access to media items 411 to the client devices 430A through 430Z. Examples of a media item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A media item may be consumed via the Internet and/or via a mobile device application. For brevity and simplicity, a digital video (also hereinafter referred to as a video) may be used as an example of a media item throughout this document. As used herein, "media," media item," "online media item," "digital media," and a "digital media item" can include an electronic file that can be executed or loaded using software, firmware or hardware configured to present the digital media item to an entity. In one embodiment, the content sharing platform 420 may store the media items using the data store 410.

In one embodiment, the media item module 435 may receive requests from client devices 430A through 430Z (e.g., receive requests from the media viewers 431) for different media items. The media item module 435 may provide the media items to the client device 430A through 430Z. For example, the media item module 435 may access a media item 411 in the data store 410 and provide the media item 411 to client device 430. In another embodiment, the media item module 435 may provide the client devices 430A through 430Z with access to the media items 411. For example, the content sharing platform 420 may authenticate a client device 430A (e.g., authenticate a user) and may redirect the client device 430A to a computing device (e.g., a server computer) outside of the content sharing platform 420 and the computing device may provide the media items 411 to the client device 430.

In one embodiment, the media item module 435 may determine the length of a media item (e.g., the total time and/or playtime of a media item). For example, the media item module 435 may determine that a media item is two minutes and fifteen seconds long. If the media item is shorter than a particular time (e.g., shorter than a minimum time and/or a threshold time), the media item module 435 may not generate previews (e.g., thumbnails, images, pictures, icons, etc.) for the media item based on scenes within the media item. For example, the media item may generate previews such that there is one preview for each second of the media item, or such that there is one preview for every five seconds of the media item. In another embodiment, if the media item is shorter than the minimum time and/or a threshold time, the media item module 435 may allow a user to seek to any portion and/or position in the media item instead of allowing a user to seek to the beginning of scenes and/or to the beginning of portions of scenes. For example, when the media item is shorter than the minimum time and/or a threshold time, the media item module 435 may allow a user to seek to any second of the media item. In different embodiments, the minimum time and/or threshold time may be any length of time. For example, the minimum time may be two minutes, five minutes, seven minutes and thirty seconds, ten minutes, etc.

In one embodiment, the media item module 435 may identify scenes in a media item 411. The media item module 435 may use various algorithms, functions, software modules, software components, applications, etc., to identify scenes in the media item 411. For example, the media item module 435 may use an algorithm and/or a software module that detects when a scene transition occurs (e.g., when one scene changes to a second scene) to determine when a scene begins and/or when a scene ends. In another embodiment, the media item module 435 may also determine times and/or timestamps for the beginning of a scene and/or the end of a scene. For example, the media item module 435 may determine that a scene starts at four minutes and thirty-three seconds (4:33) into a media item and that the scene ends at six minutes and forty-nine seconds (6:49) into the media item. The start times and/or end times for the scenes may also be recorded in the data store 410.

The media item module 435 may also determine the length of each scene in the media item. In one embodiment, if a scene is shorter than a first threshold length (e.g., shorter than sixty seconds), the media item module 435 may not generate a preview for the scene. In another embodiment, if the scene is longer than a first threshold length (e.g., sixty seconds) but shorter than a second threshold length (e.g., one hundred and twenty seconds), the media item module 435 may generate one preview for the scene and associate the preview within the scene. The media item module 435 may use one of the frames in the scene (e.g., the first frame, a middle frame, the last frame, etc.) to generated the preview. For example, the media item module may use the first frame to generate a lower resolution version of the first frame for the preview.

In a further embodiment, if the scene is longer than a first threshold length (e.g., sixty seconds) and longer than the second threshold length (e.g., one hundred and twenty seconds), the media item module 435 may generate multiple previews for the scene, and associate each preview with a portion of the scene. The media item module 435 may divide a scene that is longer than the second threshold length into multiple portions in various ways. For example, the media item module 435 may split a scene into a number of equal size portions (e.g., forty-five second portions, two-minute portions, etc.). The number of portions may be based on the length of the scene (e.g., the longer the scene, the greater the number of portions of the scene). In another example, the media item module 435 may divide the scene based on fixed length. For example, the media item module 435 may use a fixed sixty second length to divide the scene into different portions. A one-hundred and forty three second long scene may be divided into a first portion that is sixty seconds long, a second portion that is sixty seconds long, and a third portion that is twenty-three seconds long. In one embodiment, the media item module 435 may also generate a preview for each portion of a scene that is divided into multiple portions. For example, the media item module 435 may use one of the frames (e.g., the first frame in a portion, a middle frame in the portion, etc.) from each portion of the scene to generate the preview for the portion of the scene. Referring back to FIG. 1, the media item module 435 may use frame 111 to generate a preview for scene 110A, frame 121 to generate a preview for the first portion of scene 110B, and frame 122 to generate a preview for the second portion of scene 110B. In different embodiments, any length may be used for the first threshold length and the second threshold length.

In one embodiment, media item module 435 may only allow a user to seek (e.g., jump and/or skip) to the beginning of a scene and/or a beginning of a portion of a scene within the media item. As discussed above, the media item module 435 may identify scenes in a media item and may divide scenes that are longer than the second threshold length into multiple portions. When a user provides user input (e.g., via a playback bar and/or playback slider illustrated in FIGS. 2 and 3) to seek to a specific time and/or timestamp in the media item, the media item module 435 may determine which scene and/or portion of the scene corresponds to the specific time and/or timestamp in the media item. The media item module 435 may provide the media item starting at the beginning of the scene and/or portion of the scene, to the user. For example, referring to FIG. 1, a user may use the playback bar to indicate that the user wants to seek to a time and/or timestamp in the media item 100 that is within scene 110B and between frames 122 and 123. The media item module 435 determine that the time and/or timestamp in the media item 100 is in the second portion of the scene 110B and may provide the media item 100 to the user starting at frame 122.

In one embodiment, the media item module 435 may also provide a media viewer including a GUI to the client devices 430A through 430Z. For example, the media item module 435 may provide a media viewer that includes the GUI 200 illustrated in FIG. 2. In one embodiment, the media item module 435 may provide an embedded media viewer (e.g., a Flash® player or an HTML5 player embedded in a web page) to one or more of the client devices 430A through 430Z. In another embodiment, the media item module 435 may provide a standalone media viewer (e.g., a media player application) to the client device 340 and/or 350. The media item module 435 may receive user input from a user via the GUI that is part of the media viewer. For example, the media item module 435 may receive user input indicating that the user is interacting with a playback bar in a GUI Of the media viewer (e.g., moving a pointer over a location in the playback bar, dragging or moving a playback slider, etc.).

Figure 5:
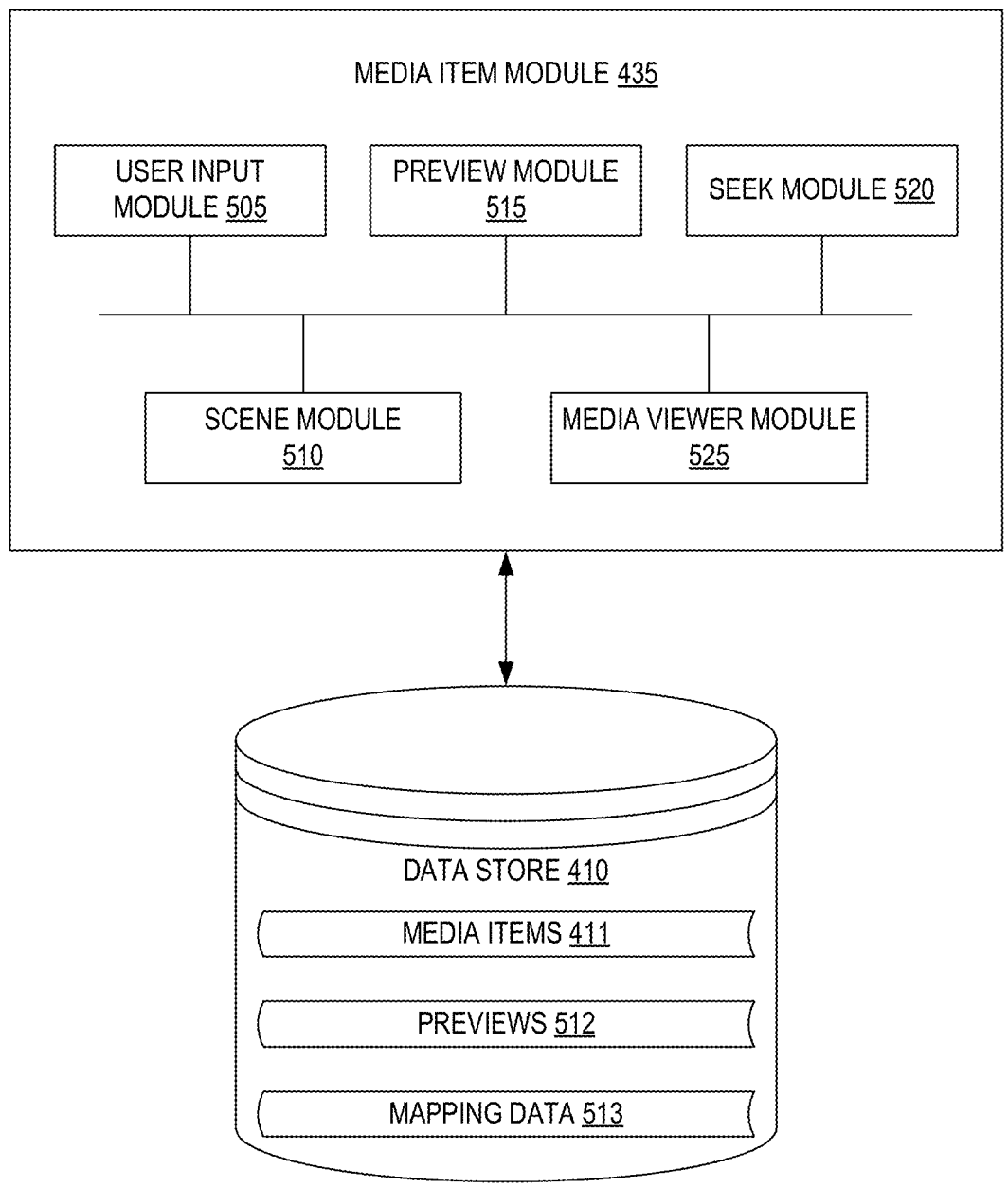
FIG. 5 is a block diagram illustrating a media item module, in accordance with one embodiment of the present disclosure.

FIG. 5 is a block diagram illustrating a media item module 435, in accordance with one embodiment of the present disclosure. The media item module 435 includes a user input module 505, a scene module 510, a preview module 515, a seek module 520, and a media viewer module 525. More or less components may be included in the media item module 435 without loss of generality. For example, two of the modules may be combined into a single module, or one of the modules may be divided into two or more modules. In one embodiment, one or more of the modules may reside on different computing devices (e.g., different server computers).

The media item module 435 is communicatively coupled to the data store 410. For example, the media item module 435 may be coupled to the data store 410 via a network (e.g., via network 405 as illustrated in FIG. 4). In another example, the media item module 435 may be coupled directly to a content sharing platform where the media item module 435 resides (e.g., may be directly coupled to content sharing platform 420). The data store 410 may be a memory (e.g., random access memory), a cache, a drive (e.g., a hard drive), a flash drive, a database system, or another type of component or device capable of storing data. The data store 410 may also include multiple storage components (e.g., multiple drives or multiple databases) that may also span multiple computing devices (e.g., multiple server computers). The data store 410 includes media items 411, preview 512, and mapping data 513. In one embodiment, the media items 411, the previews 512, and the mapping data 513 may each be stored on separate data stores. The previews 512 may include previews (e.g., thumbnails, images, pictures, icons, and/or other data) that are generated by the media item module for scenes and/or portions of scenes in the media items 411. The mapping data 513 may include data indicating the scenes, portion of a scene, and/or timestamps (e.g., a begin time and an end time) that each preview is associated with. For example, referring back to FIG. 1, the mapping data 513 may indicate that a first preview is associated with scene 110A of media item 100. The mapping data 513 may also indicate the starting time of the scene 110A (e.g., 0:00) and an ending time of the scene 110A (e.g., 0:45). The starting time and the ending time may be associated with the first preview. The mapping data 413 may allow the media item module 435 to identify which preview should be provided to a user when the user interacts with the playback bar. The mapping data 413 may also allow the media item module 435 to identify which scene and/or portion of the scene to seek (e.g., jump and/or move to) when the user interacts with the playback bar.

In one embodiment, the scene module 510 may determine the length of a media item (e.g., the total time and/or playtime of a media item) and may not generate previews (e.g., thumbnails, images, pictures, icons, etc.) for the media item based on scenes within the media item if the media item is shorter than a minimum length and/or a threshold length. If the length of the media item is greater than the minimum length and/or threshold length, the scene module 510 may identify the different scenes in the media item. The scene module 510 may use any algorithm, function, operation, software component, software module, and/or application to identify scenes in media items. The scene module 510 may also determine whether a scene is shorter than a first threshold length the media item module 435 may not generate a preview for the scene if a scene is shorter than the first threshold length. The scene module 510 may also determine whether a scene is longer than the first threshold length and longer than a second threshold length. If the scene is longer than a first threshold length (e.g., sixty seconds) but shorter than a second threshold length (e.g., one hundred and twenty seconds), the scene module 510 may identify a start time (e.g., a starting timestamp) and an end time (e.g., an ending timestamp) for the scene. If the scene is longer than the first threshold length and longer than the second threshold length, the scene module 510 divide the scene into multiple portions, and may identify a start time (e.g., a starting timestamp) and an end time (e.g., an ending timestamp) for each portion in the scene. As discussed above, the scene module 510 may divide a scene into multiple portions in various ways (e.g., equal size portions, fixed length portions, etc.). In one embodiment, the scene module 510 may provide the start times of scenes and/or portions of scenes to the preview module 515. In another embodiment, the scene module 510 may provide frames from the scenes and/or portions of the scenes of the preview module 515.

The preview module 515 may generate previews (e.g., thumbnails, images, pictures, icons, etc.) for a scene and/or a portion of a scene in a media item. In one embodiment, when the preview module 515 receives a timestamp from the scene module 510, the preview module may use the timestamp to identify a frame in the media item. For example, as discussed above, each frame may be associated with a timestamp of the media item. The preview module 515 may identify the frame associated with the timestamp and generate a preview based on the identified frame (e.g., generate a lower resolution version of the frame). In another embodiment, when the preview module 515 receives a frame (from the media item) from the scene module 510, the preview module 515 may generate a preview based on the received frame. The preview module 515 may store the previews that are generated, in the previews 512 in the data store 410. In one embodiment, the preview module 515 may provide a preview to a user when the user interacts with the playback bar on a media viewer. For example, when the user moves a pointer over a location in the playback bar, the media viewer may provide data indicating the location to the preview module 515. The preview module 515 may determine a time and/or timestamp in the media item based on the location in the playback bar. The preview module 515 may identify a preview using the mapping data 513 and may provide the identified preview to the user.

In one embodiment, the scene module 510 and/or the preview module 515 may create and/or update the mapping data 513. For example, as the scene module 510 identifies scenes and divides scenes, the scene module 510 may update the mapping data 513 with timestamp information (e.g., start times and/or end times) for scenes and portions of scenes. As the preview module 515 generates preview the preview module may update the mapping data to indicate which previews are associated with which scenes and/or portions of scenes.

In one embodiment, the media item module 435 may re-generate previews for a media item. For example, the scene module 510 may be modified and/or updated to user a new and/or different algorithm/module for detecting scenes. The scene module 505 may detect new scenes and may work in conjunction with the preview module 515 to re-generate previews for scenes and/or portions of scenes. The new previews may also be stored in the data store 410.

In one embodiment, the user input module 505 may receive user input from a client device (e.g., from a media viewer on the client device). The user input may indicate actions of the user and/or requests from the user received from a GUI of the media viewer. For example, the user input may indicate that the user wishes to pause playback of a media item. The user input may also indicate that the user is interacting with a playback bar on the GUI of the media viewer. For example, the user input may indicate that the user has moved a pointer over and/or selected a portion/segment of the playback bar (e.g., may indicate that the user wants to view a preview of the media item). In another example, the user input may indicate that the user moved, slid, and/or dragged a playback slider to a portion of the playback bar (e.g., may indicate that the user wants to seek to a different time and/or timestamp in the media item)

In one embodiment, the seek module 520 may allow a user to seek to any portion of the media item if the media item has a length that is lower than a minimum length (e.g., the media item is less than five minutes long, ten minutes long, etc.). In another embodiment, the seek module 520 may allow a user seek to the beginning of a scene and/or a beginning of a portion of a scene within the media item. When a user provides user input (e.g., via a playback bar and/or playback slider illustrated in FIGS. 2 and 3) to seek to a specific time and/or timestamp in the media item, the seek module 520 may determine which scene and/or portion of the scene corresponds to the specific time and/or timestamp in the media item. The seek module 520 may provide the media item starting at the beginning of the scene and/or portion of the scene, to the user. For example, referring to FIG. 2, when the user drags the playback slider 212 to a location on the playback bar between time 263 and the end of scene 110B, the seek module may provide the media item to the user starting at the frame located at time 263.

In one embodiment, the media viewer module 525 may provide a media viewer to a client device (e.g., client device 430A illustrated in FIG. 4). For example, the media viewer module 525 may provide an install file, a software component/module, a binary file, etc., to the client device and the client device may install the media viewer on the client device. In another example, the media viewer module 525 may provide a web page including an embedded media viewer (e.g., a Flash® player, an HTML5 player, etc.) to a client. The client device may use the embedded media viewer to view the 3D video of the object by accessing the web page.

Figure 6:
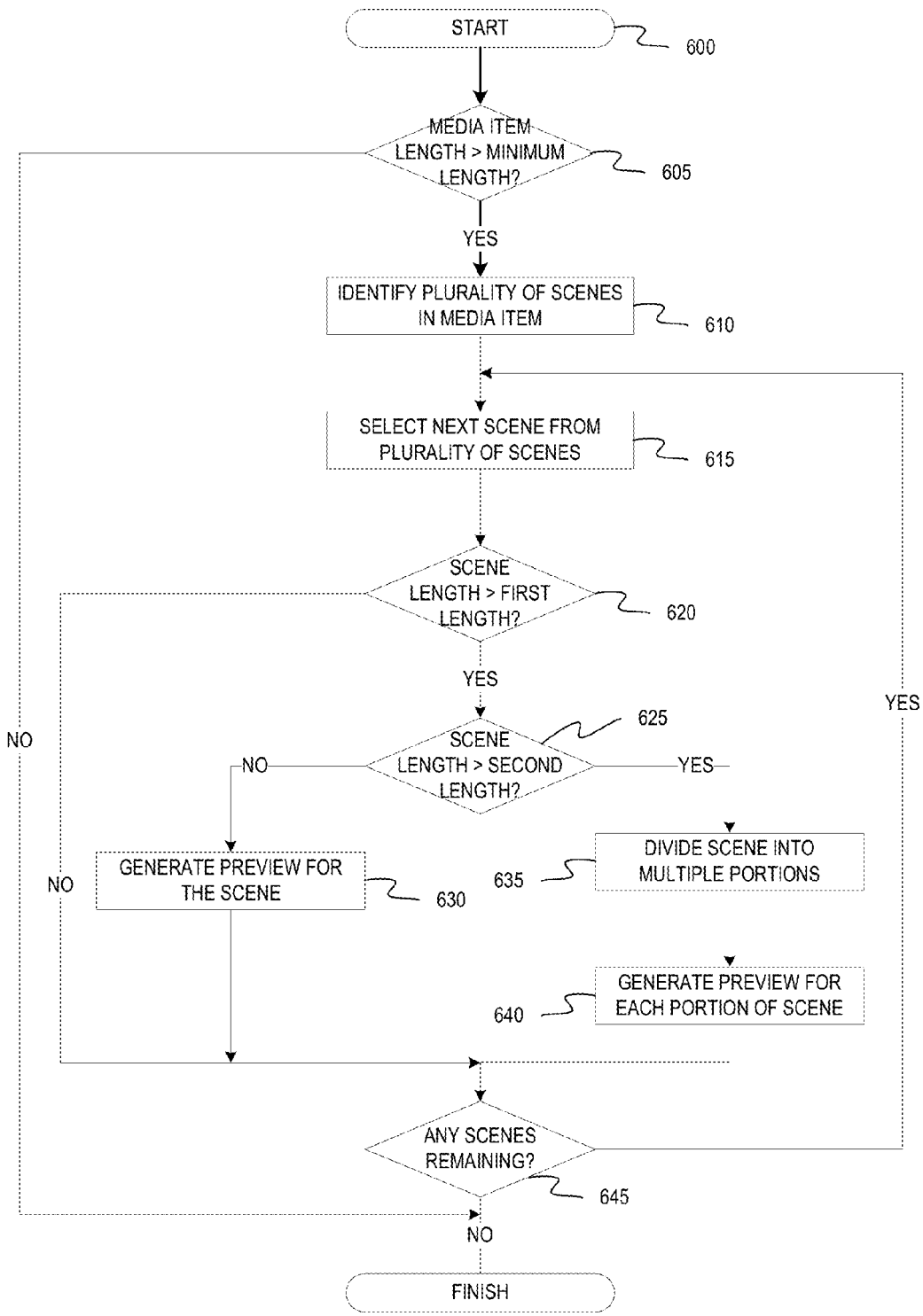
FIG. 6 is a flow diagram illustrating a method of generating previews for a media item, in accordance with one embodiment of the present disclosure.
Figure 7:
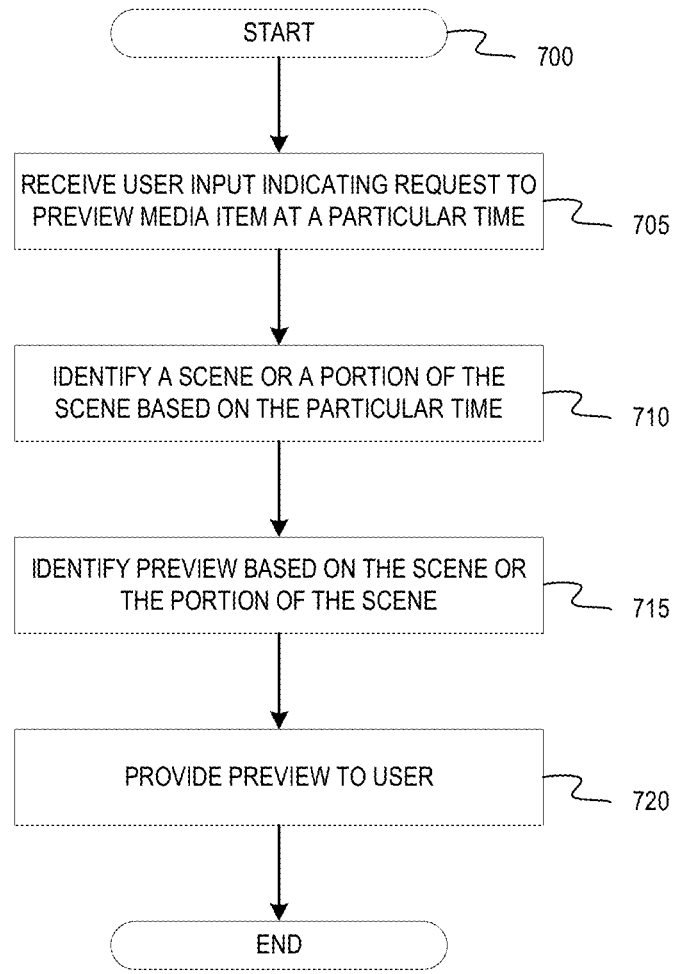
FIG. 7 is a flow diagram illustrating a method of providing previews for a media item to a user, in accordance with one embodiment of the present disclosure.
Figure 8:
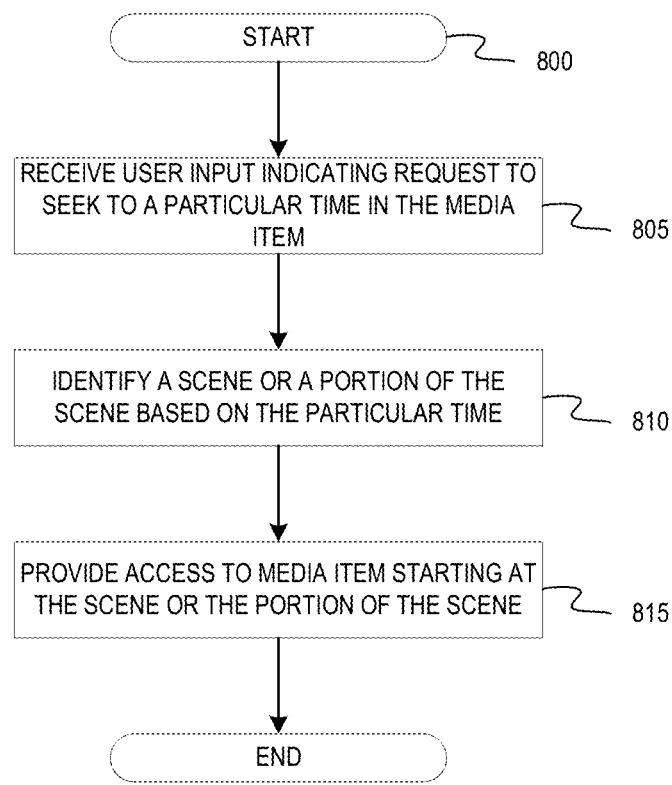
FIG. 8 is a flow diagram illustrating a method of providing a user access to a media item, in accordance with one embodiment of the present disclosure.

FIGS. 6-8 are flow diagrams illustrating methods of providing previews for media items and providing media items to users. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 6 is a flow diagram illustrating a method 600 of generating previews for a media item, in accordance with one embodiment of the present disclosure. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by a media item module, as illustrated in FIGS. 4 and 5.

Referring to FIG. 6, the method 600 begins at block 605 where the method 600 determines whether length (e.g., play time or total time) of the media item is longer than a minimum length (e.g., longer than ten minutes, longer than five minutes, etc.). If the length of the media item is shorter than the minimum length, the method 600 ends. IF the length of the media item is longer than the minimum length, the method 600 proceeds to block 610 where the method 600 identifies a plurality of scenes in the media item. For example, the method 600 may use various algorithms, functions, operations, software module, software components, and/or applications to identify scenes in the media item. The method 600 selects a next scene from the plurality of scenes (block 615).

At block 620, the method 600 determines whether the length of the scene is greater than a first length (e.g., greater than a first threshold). For example, the method 600 may determine whether the scene is longer than sixty seconds. If the scene is shorter than the first length, the method 600 ends and may not generate a preview for the scene because the scene is too short. If the scene is longer than the first length, the method 600 provides to block 625 where the method 600 determines whether the scene is longer than a second length. For example, the method 600 may determine whether the scene is longer than two minutes. If the scene is longer than the first length but shorter than the second length, the method 600 proceeds to block 630 where the method 600 generates a preview for the scene. If the scene is longer than the first length and longer than the second length, the method 600 proceeds to block 635 where the method 600 divides the scene into multiple portions. As discussed above, the method 600 may divide the scene into multiple portions using various methods (e.g., dividing the scene into a number of equal size portions or into fixed length portions). At block 640, the method 600 generates a preview for each portion of the scene and proceeds to block 645. At block 645, the method 600 determines whether there are any scenes remaining that have not been analyzed to determine whether previews should be generated for the scenes. If there are scenes which have not been analyzed, the method 600 proceeds back to block 615. If there are no scenes remaining, the method 600 ends.

FIG. 7 is a flow diagram illustrating a method 700 of providing previews for a media item to a user, in accordance with one embodiment of the present disclosure. The method 700 may be performed by processing logic that comprises hardware (e.g., circuitry, dedicated logic, programmable logic, microcode, etc.), software (e.g., instructions run on a processor to perform hardware simulation), or a combination thereof. In one embodiment, method 700 may be performed by a media item module, as illustrated in FIGS. 4 and 5.

Referring to FIG. 7, the method 700 begins at block 705 where the method the method 700 receives user input indicating a request to preview a media item at a particular point in time. For example, the user may move a pointer to a specific location of a playback bar of a GUI in a media viewer. The media viewer may determine a particular point in time within the media item, based on the location of the pointer. The method 700 may receive the particular point in time from the media viewer on a user's client device. At block 710, the method 700 may identify a scene or a portion of a scene based on the particular point in time. For example, referring back to FIG. 1, the method 700 may determine that the particular point in time falls within the first portion of scene 110B of the media item 100 (e.g., falls between frame 121 and frame 122). At block 715, the method 700 may identify a preview based on the scene or portion of the scene. For example, the method 700 may identify a preview associated with the first portion of the scene 110B of the media item 100 based on mapping data (e.g., mapping data 513 illustrated in FIG. 5). The method 700 provides the preview to the user at block 720. After block 720, the method 700 ends.

FIG. 8 is a flow diagram illustrating a method 800 of providing a user access to a media item, in accordance with one embodiment of the present disclosure. The method 800 may be performed by processing logic that comprises hardware (e.g., circuitry, dedicated logic, programmable logic, microcode, etc.), software (e.g., instructions run on a processor to perform hardware simulation), or a combination thereof. In one embodiment, method 800 may be performed by a media item module, as illustrated in FIGS. 4 and 5.

Referring to FIG. 8, the method 800 begins at block 805 where the method 800 receives user input indicating a request to seek to a particular point in time in the media item. For example, the user may move, drag, and/or slide a playback slider to a specific location of a playback bar of a GUI in a media viewer. The media viewer may determine a particular point in time within the media item, based on the location of the pointer. The method 800 may receive the particular point in time from the media viewer on a user's client device. At block 810, the method 700 may identify a scene or a portion of a scene based on the particular point in time. For example, referring back to FIG. 1, the method 800 may determine that the particular point in time falls within the scene 110A of the media item 100 (e.g., falls between frame 111 and frame 113). At block 815, the method 700 provides the user access to the media item (and/or provide the media item) starting at the scene or the portion of the scene. After block 815, the method 700 ends.

Figure 9:
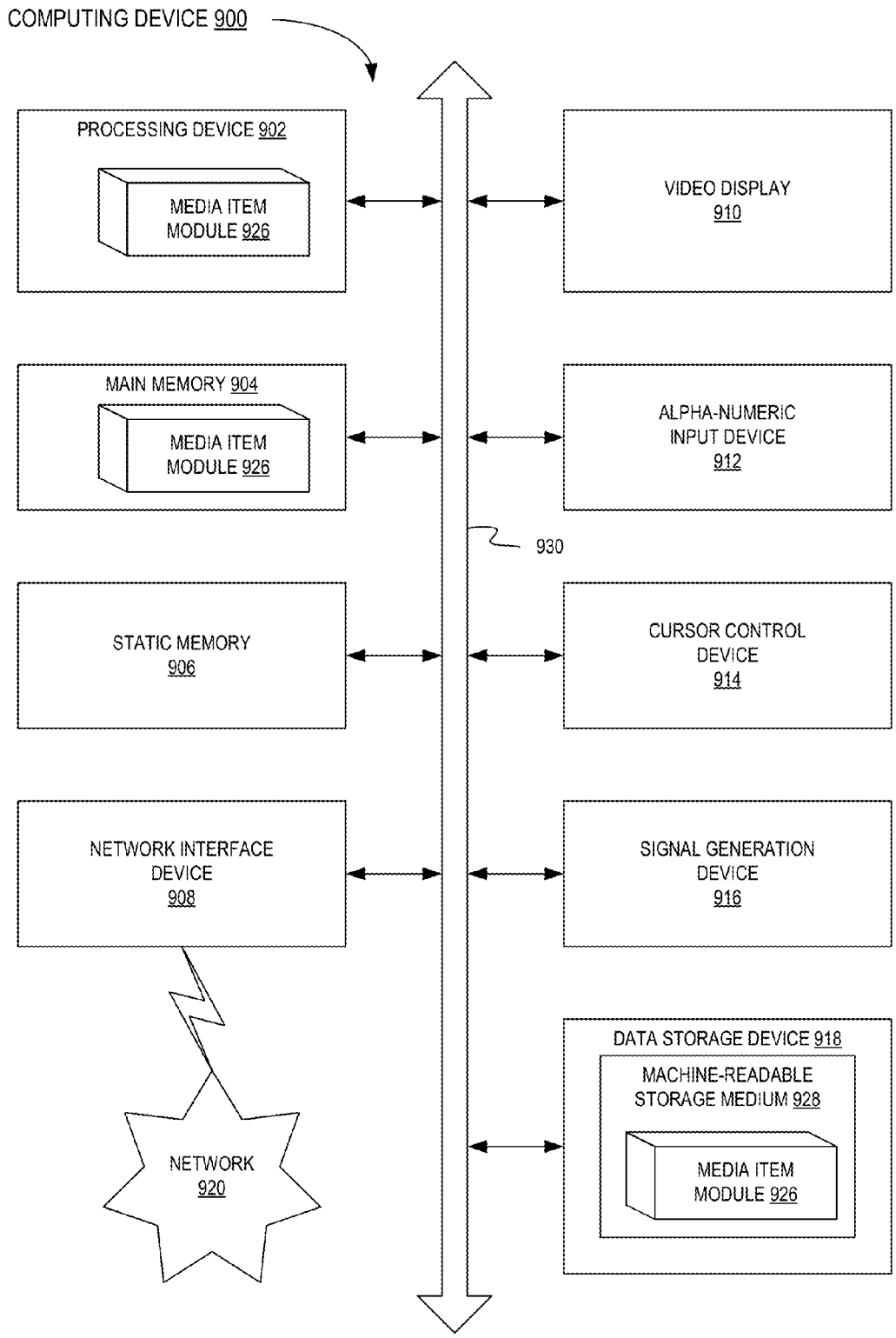
FIG. 9 is a block diagram of an example computing device that may perform one or more of the operations described herein.

FIG. 9 illustrates a diagrammatic representation of a machine in the example form of a computing device 900 within which a set of instructions, for causing the machine to perform any one or more of the methodologies discussed herein, may be executed. The computing device 900 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute media item module 926 for performing the operations and steps discussed herein.

The computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and a signal generation device 916 (e.g., a speaker). In one embodiment, the video display unit 910, the alphanumeric input device 912, and the cursor control device 914 may be combined into a single component or device (e.g., an LCD touch screen).

The data storage device 918 may include a computer-readable storage medium 928 on which is stored one or more sets of instructions (e.g., media item module 926) embodying any one or more of the methodologies or functions described herein. The media item module 926 may also reside, completely or at least partially, within the main memory 904 and/or within the processing device 902 during execution thereof by the computing device 900, the main memory 904 and the processing device 902 also constituting computer-readable media. The instructions may further be transmitted or received over a network 920 via the network interface device 908.

While the computer-readable storage medium 928 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "generating," "providing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
identifying a plurality of scenes in a digital video; and
generating, by a processing device, per-scene previews for the digital video having the plurality of scenes, wherein generating the per-scene previews comprises:
comparing a length of each of the plurality of scenes with a first threshold length and a second threshold length;
responsive to determining that a first scene of the plurality of scenes is longer than the first threshold length and does not exceed the second threshold length, generating a single preview for the first scene; and
responsive to determining that a second scene of the plurality of scenes is longer than the first threshold length and longer than the second threshold length, generating a plurality of previews for the second scene.

2. The method of claim 1, wherein each preview in the plurality of previews of the second scene is associated with a portion of the second scene.

3. The method of claim 1, wherein one or more of the single preview or the plurality of previews are generated based on timestamps associated with the plurality of scenes.

4. The method of claim 1, wherein one or more of the single preview or the plurality of previews are generated based on frames within the plurality of scenes.

5. The method of claim 1, further comprising:
receiving a user input indicating a request to preview the digital video at a particular point in time in the digital video;
identifying a second preview, wherein the second preview is associated with a third scene or a portion of the third scene at the particular point in time; and
providing the second preview to a client device.

6. The method of claim 5, wherein identifying the second preview comprises:
identifying the third scene or the portion of the third scene based on the particular point in time; and
identifying the second preview based on the third scene or the portion of the third scene.

7. The method of claim 1, further comprising:
receiving a user input indicating a request to seek to a particular point in time in the digital video;
identifying a third scene or a portion of the third scene at the particular point in time, based on the user input; and
providing access to the digital video starting at the third scene or the portion of the third scene.

8. The method of claim 1, further comprising:
determining whether the digital video is longer than a minimum length, wherein the identifying, and the generating are performed when the digital video is longer than the minimum length.

9. An apparatus comprising:
a memory;
a processing device coupled to the memory, the processing device to:
identify a plurality of scenes in a digital video; and
generate per-scene previews for the digital video having the plurality of scenes, wherein to generate the per-scene previews the processing device is to:
compare a length of each of the plurality of scenes with a first threshold length and a second threshold length;
responsive to determining that a first scene of the plurality of scenes is longer than the first threshold length and does not exceed the second threshold length, generate a single preview for the first scene; and
responsive to determining that a second scene of the plurality of scenes is longer than the first threshold length and longer than the second threshold length, generate a plurality of previews for the second scene.

10. The apparatus of claim 9, wherein one or more of the single preview or the plurality of previews are generated based on timestamps associated with the plurality of scenes or based on frames within the plurality of scenes.

11. The apparatus of claim 9, wherein the processing devices is further to:
receive a user input indicating a request to preview the digital video at a particular point in time in the digital video;
identify a second preview, wherein the second preview is associated with a third scene or a portion of the third scene at the particular point in time; and
provide the second preview to a client device.

12. The apparatus of claim 11, wherein processing device is to identify the second preview by:
identifying the third scene or the portion of the third scene based on the particular point in time; and
identifying the second preview based on the third scene or the portion of the third scene.

13. The apparatus of claim 9, wherein the processing devices is further to:
receive a user input indicating a request to seek to a particular point in time in the digital video;
identify a third scene or a portion of the third scene at the particular point in time, based on the user input; and
provide access to the digital video starting at the third scene or the portion of the third scene.

14. The apparatus of claim 9, wherein the processing devices is further to:
determine whether the digital video is longer than a minimum length, wherein the identifying, and the generating are performed when the digital video is longer than the minimum length.

15. A non-transitory computer readable storage medium comprising instructions that, when executed by a processing device, cause the processing device to perform operations comprising:
- identifying a plurality of scenes in a digital video; and
- generating, by the processing device, per-scene previews for the digital video having the plurality of scenes, wherein generating the per-scene previews comprises:
  - comparing a length of each of the plurality of scenes with a first threshold length and a second threshold length;
  - responsive to determining that a first scene of the plurality of scenes is longer than the first threshold length and does not exceed the second threshold length, generating a single preview for the first scene; and
  - responsive to determining that a second scene of the plurality of scenes is longer than the first threshold length and longer than the second threshold length, generating a plurality of previews for the second scene.

16. The non-transitory computer readable storage medium of claim 15, wherein the operations further comprise:
- receiving a user input indicating a request to preview the digital video at a particular point in time in the digital video;
- identifying a second preview, wherein the second preview is associated with a third scene or a portion of the third scene at the particular point in time; and
- providing the second preview to a client device.

17. The non-transitory computer readable storage medium of claim 16, wherein identifying the second preview comprises:
- identifying the third scene or the portion of the third scene based on the particular point in time; and
- identifying the second preview based on the third scene or the portion of the third scene.

18. The non-transitory computer readable storage medium of claim 15, wherein the operations further comprise:
- receiving a user input indicating a request to seek to a particular point in time in the digital video;
- identifying a third scene or a portion of the third scene at the particular point in time, based on the user input; and
- providing access to the digital video starting at the third scene or the portion of the third scene.

19. The non-transitory computer readable storage medium of claim 15, wherein the operations further comprise:
- determining whether the digital video is longer than a minimum length, wherein the identifying, and the generating are performed when the digital video is longer than the minimum length.

* * * * *